United States Patent
Wang et al.

(10) Patent No.: US 7,616,723 B2
(45) Date of Patent: Nov. 10, 2009

(54) METHOD FOR SYMBOL TIMING SYNCHRONIZATION AND APPARATUS THEREOF

(75) Inventors: Chih-Yaw Wang, Huatan Township, Changhua County (TW); Chih-Chun Feng, Beigang Township, Yunlin County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 696 days.

(21) Appl. No.: 11/386,368

(22) Filed: Mar. 21, 2006

(65) Prior Publication Data

US 2007/0092044 A1    Apr. 26, 2007

(30) Foreign Application Priority Data

Oct. 26, 2005    (TW) ............................. 94137426 A

(51) Int. Cl.
  *H04L 7/00* (2006.01)
(52) U.S. Cl. ........................ 375/355; 375/354
(58) Field of Classification Search ................ 375/355, 375/354
  See application file for complete search history.

(56) References Cited

U.S. PATENT DOCUMENTS

| | | | | |
|---|---|---|---|---|
| 5,541,552 | A | 7/1996 | Suzuki et al. | 329/307 |
| 5,812,523 | A | 9/1998 | Isaksson et al. | 370/208 |
| 5,991,289 | A * | 11/1999 | Huang et al. | 370/350 |
| 6,088,406 | A | 7/2000 | Suzuki | 375/343 |
| 6,421,401 | B1 | 7/2002 | Palin | 375/343 |
| 2001/0050950 | A1 * | 12/2001 | Sato | 375/150 |
| 2005/0152317 | A1 * | 7/2005 | Awater et al. | 370/338 |
| 2006/0078040 | A1 * | 4/2006 | Sung et al. | 375/140 |
| 2006/0098749 | A1 * | 5/2006 | Sung et al. | 375/260 |
| 2006/0146962 | A1 * | 7/2006 | Troya et al. | 375/340 |

OTHER PUBLICATIONS

Du, "Improved coarse frequency synchronization algorithm with extended differential detection," WCNC 2003, vol. 1, pp. 470-474, Mar. 2003.*

"Enhanced Symbol Synchronization Method for OFDM System in SFN Channels" Arto Palin, Global Telecommunications Conference, 1998. GLOBECOM 98. The Bridge to Global Integration. IEEE, vol. 5, pp. 2788-2793.

* cited by examiner

*Primary Examiner*—Juan A Torres
(74) *Attorney, Agent, or Firm*—J.C. Patents

(57) ABSTRACT

A method for symbol timing synchronization is provided. The method comprises the following steps. First, a correlation between a sample sequence and a delayed sample sequence is calculated to generate a correlation sequence. Wherein, the delayed sample sequence is obtained from delaying the sample sequence by N sampling points, and N is the length of the useful data for a symbol in the sample sequence. Then, a moving average of the correlation sequence is calculated to generate a cross-correlation sequence, and the cross-correlation sequence is differentiated to generate a differentiated sequence. Finally, a moving average of the differentiated sequence is calculated to generate a moving-averaged sequence, and the peak position of the moving-averaged sequence is detected in order to obtain the correct symbol timing for synchronization.

20 Claims, 10 Drawing Sheets

METHOD FOR SYMBOL TIMING SYNCHRONIZATION AND APPARATUS THEREOF

CROSS-REFERENCE TO RELATED APPLICATION

This application claims the priority benefit of Taiwan application serial no. 94137426, filed on Oct. 26, 2005. All disclosure of the Taiwan application is incorporated herein by reference.

BACKGROUND OF THE INVENTION

1. Field of the Invention

The present invention relates to a symbol timing synchronization, and more particularly, to a method for symbol timing synchronization suitable for a receiver in an orthogonal frequency division multiplexing (OFDM) system and an apparatus applying the same.

2. Description of the Related Art

The receiver in the OFDM communication system is to detect the start position of each symbol in order to correctly recovery the information transmitted by the transmitter, such operation is referred to as the "symbol timing synchronization". For some OFDM systems, such as the WLAN (Wireless Local Area Network) or the DAB (Digital Audio Broadcast) systems, the transmitter in such system transmits some preamble or training sequence, such that the receiver can use it for the symbol timing synchronization. However, for some other OFDM systems, such as the DVB-T system, the transmitter does not transmit such preamble or training sequence. These systems usually utilize the characteristic of the guard intervals to detect symbol timing.

FIG. 1 is a schematic diagram illustrating how the conventional OFDM system uses guard intervals to detect the symbol timing in the AWGN (Additive White Gaussian Noise) channel. Referring to FIG. 1, $r[n]$ represents a sample sequence of the received OFDM signal through a analog-to-digital conversion, and $r[n-N]$ represents a sequence obtained from delaying the sample sequence $r[n]$ by N sampling points. Wherein, the sample sequence $r[n]$ is composed of a plurality of symbols, e.g. the symbols 110 and 120, and the delayed sequence $r[n-N]$ is composed of a plurality of symbols, e.g. the symbols 110' and 120'. Each symbol is composed of a guard interval of a length Ng (or has Ng sample points) and a useful data of a length N (or has N sampling points). The guard interval is in front of the useful data and is copied from an end part of the useful data.

For example, the guard interval 111 of the symbol 110 is copied from the end part 112 of the useful data, and the symbol 110' is obtained from delaying the symbol 110 by N sampling points. The data in the guard interval 111' is the same as the data in the guard interval 111 (the only difference is the existence of a delay gap), and the guard interval 111 is copied from the end part 112. Accordingly, the data in the guard interval 111' is the same as the data in the end part 112. Similarly, the data in the end part 112' of the symbol 110' is the same as the data in the end part 112 of the symbol 110 (the only difference is the existence of a delay gap).

Since the duplicate structures (e.g. the guard interval 111 copied from the end part 112) is disposed in each symbol, some correlation exists between the sequences $r[n]$ and $r[n-N]$. For example, a correlation sequence $j[n]$ can be calculated from multiplying a complex conjugate of one of the sequence $r[n]$ and $r[n-N]$ by the either one of the sequence $r[n]$ and $r[n-N]$, i.e. $(r^*[n] \times r[n-N])$ or $(r[n] \times r^*[n-N])$. It is found that there is a high correlation between the sequences $r[n]$ and $r[n-N]$ during the interval 113 in the correlation sequence $j[n]$. Finally, a moving average of the correlation sequence $j[n]$ is calculated to generate a cross-correlation sequence $c[n]$, and the position of a peak 114 (i.e. the peak position) is detected in order to obtain a correct start position of the next symbol (e.g. the symbol 120).

In addition, in U.S. Pat. No. 6,088,406, the peaks of the cross-correlation sequence are more distinct by accumulating the correlation sequences of the multiple symbols, such that the reliability of the detection of the peak position is improved. However, the reliability of the method for detecting the symbol timing mentioned above is insufficient in the time-dispersive channel. Especially for the time-dispersive channel with long echo delay, such as the single frequency network (SFN) channel that is commonly used in the broadcast system, its reliability is not satisfactory. This is because the peaks of the cross-correlation sequence in the SFN channel are not as distinct as in the AWGN channel.

FIG. 2 is a schematic diagram of applying the method for symbol timing synchronization of FIG. 1 in the SFN channel with two paths. Wherein, these two paths have the same gain, and the path difference between them is Ng. Accordingly, after the OFDM signal had passed through the SFN channel, the receiver obtains a sample sequence $r_1[n]$ from one path and obtains a sample sequence $r_2[n]$ from the other path. In other words, the sample sequence $r[n]$ is composed of the sequences $r_1[n]$ and $r_2[n]$.

A symbol 210 in the sample sequence $r_1[n]$ is exemplified herein. The symbol 220 in the sample sequence $r_2[n]$ has the same data as the symbol 210 in the sample sequence $r_1[n]$. After the correlation and the moving average of the sequences $r_1[n]$ and $r_2[n]$ is calculated respectively, the sequences $c_1[n]$ and $c_2[n]$ are generated respectively. Therefore, the cross-correlation sequence $c[n]$ is regarded as a combination of the sequences $c_1[n]$ and $c_2[n]$. Comparing to the cross-correlation sequence $c[n]$ in the AWGN shown in FIG. 1, the cross-correlation sequence $c[n]$ in the SFN channel shown in FIG. 2 has a peak region rather than a distinct peak. Ideally, all sampling points in the peak region have the same value, i.e. the maximum value. Unfortunately, the values of the sampling points in the peak region are fluctuated due to noise and interference signal, so it is more difficult to detect the correct symbol position 214.

To resolve the drawback of the above-mentioned symbol timing synchronization method such as the symbol position is not easily detected in the time-dispersive channel of the SFN channel, another method is disclosed in U.S. Pat. No. 6,421,401. In the proposed method, the correlation is calculated by two correlation calculators, thus a more distinct peak is provided. However, it is obvious that such method requires additional correlation calculators, which means more multipliers and memory devices are required, thus the configuration is more complicated. In addition, in the thesis of "Enhanced symbol synchronization method for OFDM system in SFN channels" proposed by A. Palin and J. Rinne in IEEE Globecom Conference, 1998, it discloses that the symbol timing can be evaluated by determining whether the amplitude of the sampling points in the cross-correlation sequence has increased to a level exceeding a predetermined threshold. However, in different types of time-dispersive channels, the amplitude ranges of the sampling points in the cross-correlation sequence are not the same. Thus, it is hard to choose an appropriate threshold that is suitable for all types of time-dispersive channels.

SUMMARY OF THE INVENTION

Therefore, it is an object of the present invention to provide a method for detecting the symbol timing in an orthogonal frequency division multiplexing (OFDM) communication system, and an apparatus applying the same. The present invention is less complex with higher reliability, and is also suitable for all types of channels, especially for the time-dispersive channel with long echo delay.

The present invention provides a method for symbol timing synchronization which is suitable for a receiver in a communication system such as an OFDM system and also suitable for all types of channels, especially for the time-dispersive channel with long echo delay. The method comprises the following steps. First, a correlation between a sample sequence and a delayed sample sequence is calculated to generate a correlation sequence. Wherein, the delayed sample sequence is obtained from delaying the sample sequence by N sampling points, and N is the length of the useful data for a symbol in the sample sequence. Then, a moving average of the correlation sequence is calculated to generate a cross-correlation sequence, and the cross-correlation sequence is differentiated to generate a differentiated sequence. Finally, a moving average of the differentiated sequence is calculated to generate a moving-averaged sequence, and the peak position of the moving-averaged sequence is detected. Wherein, the peak position of the moving-averaged sequence is used to obtain the correct symbol timing for synchronization.

In an embodiment of the present invention, the method for symbol timing synchronization mentioned above further comprises averaging or accumulating M symbols on the cross-correlation sequence before differentiating the cross-correlation sequence to generate the differentiated sequence, where M is a positive integer. In addition, the method for symbol timing synchronization mentioned above further comprises providing an indicator, and the indicator is a value obtained by subtracting the peak value (i.e. the maximum value) of the moving-averaged sequence by the minimum value of the moving-averaged sequence. The indicator is then compared with a predetermined threshold to determine whether OFDM symbols exist or not.

The present invention provides a symbol timing synchronization apparatus. In an embodiment of the present invention, the apparatus comprises a correlation calculator, a differentiator, a moving average calculator and a peak detector. In the present embodiment, the correlation calculator receives a sample sequence, calculates a correlation between the sample sequence and a delayed sample sequence obtained from delaying the sample sequence by N sampling points to generate a correlation sequence, and obtains a moving average of the correlation sequence to generate a cross-correlation sequence, where N is the length of the useful data for a symbol in the sample sequence. The differentiator coupled to the correlation calculator differentiates the cross-correlation sequence to generate the differentiated sequence. The moving average calculator coupled to the differentiator averages the differentiated sequence to generate the moving-averaged sequence. The peak detector coupled to the moving average calculator detects the peak position of the moving-averaged sequence in order to obtain the correct symbol timing for synchronization.

In an embodiment of the present invention, the symbol timing synchronization apparatus mentioned above further comprises a symbol average calculator (or a symbol accumulator). The symbol average calculator (or the symbol accumulator), coupled between the correlation calculator and the differentiator, averages (or accumulates) M symbols on the cross-correlation sequence to generate the symbol-averaged (or symbol-accumulated) cross-correlation sequence, where M is a positive integer. In addition, the peak detector in the symbol timing synchronization apparatus mentioned above further generates an indicator, and the indicator is a value obtained by subtracting the peak value of the moving-averaged sequence by the minimum value of the moving-averaged sequence. The indicator is then compared with a predetermined threshold to determine whether OFDM symbols exist or not.

In the present invention, since the cross-correlation sequence is differentiated and then is taken a moving average, a distinct peak can be also generated even through the OFDM signal is in the time-dispersive channel with long echo delay. Accordingly, the symbol timing detection provided by the present invention gives a higher reliability.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

To simplify the description of the embodiments, an OFDM system using the guard intervals to detect the symbol timing is taken as an example for illustrating the communication system herein. After the receiver in the OFDM system has received the OFDM signal and converted the received OFDM signal from analog to digital, a sample sequence r[n] is generated. Meanwhile, in order to correctly demodulate the information transmitted by the transmitter, the start position of each symbol in the sample sequence r[n] must be detected, and this operation is referred to as the "symbol timing synchronization".

Figure 1:
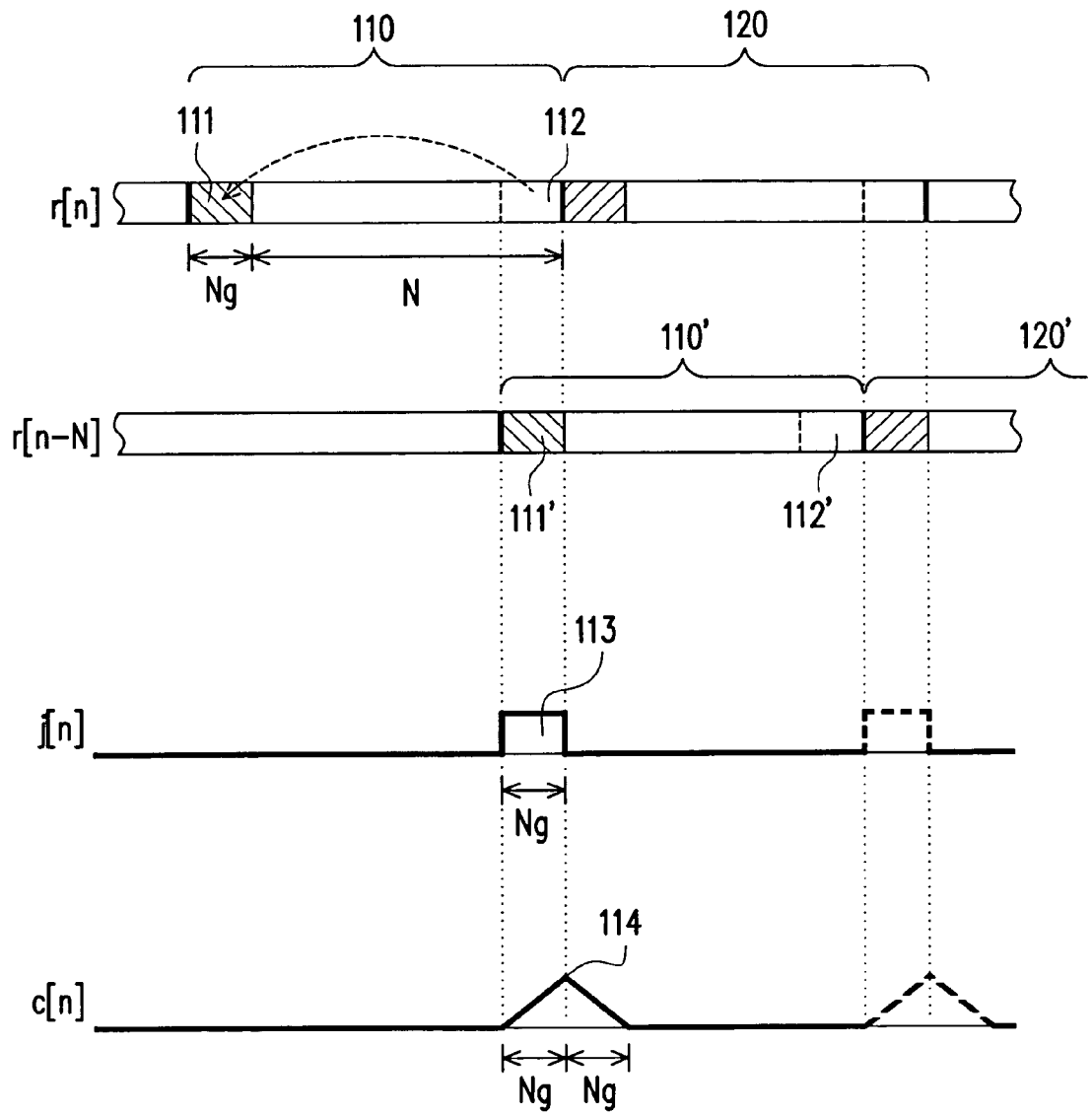
FIG. 1 is a schematic diagram illustrating a case that the conventional OFDM system uses guard intervals to detect the symbol timing in the AWGN (Additive White Gaussian Noise) channel.
Figure 2:
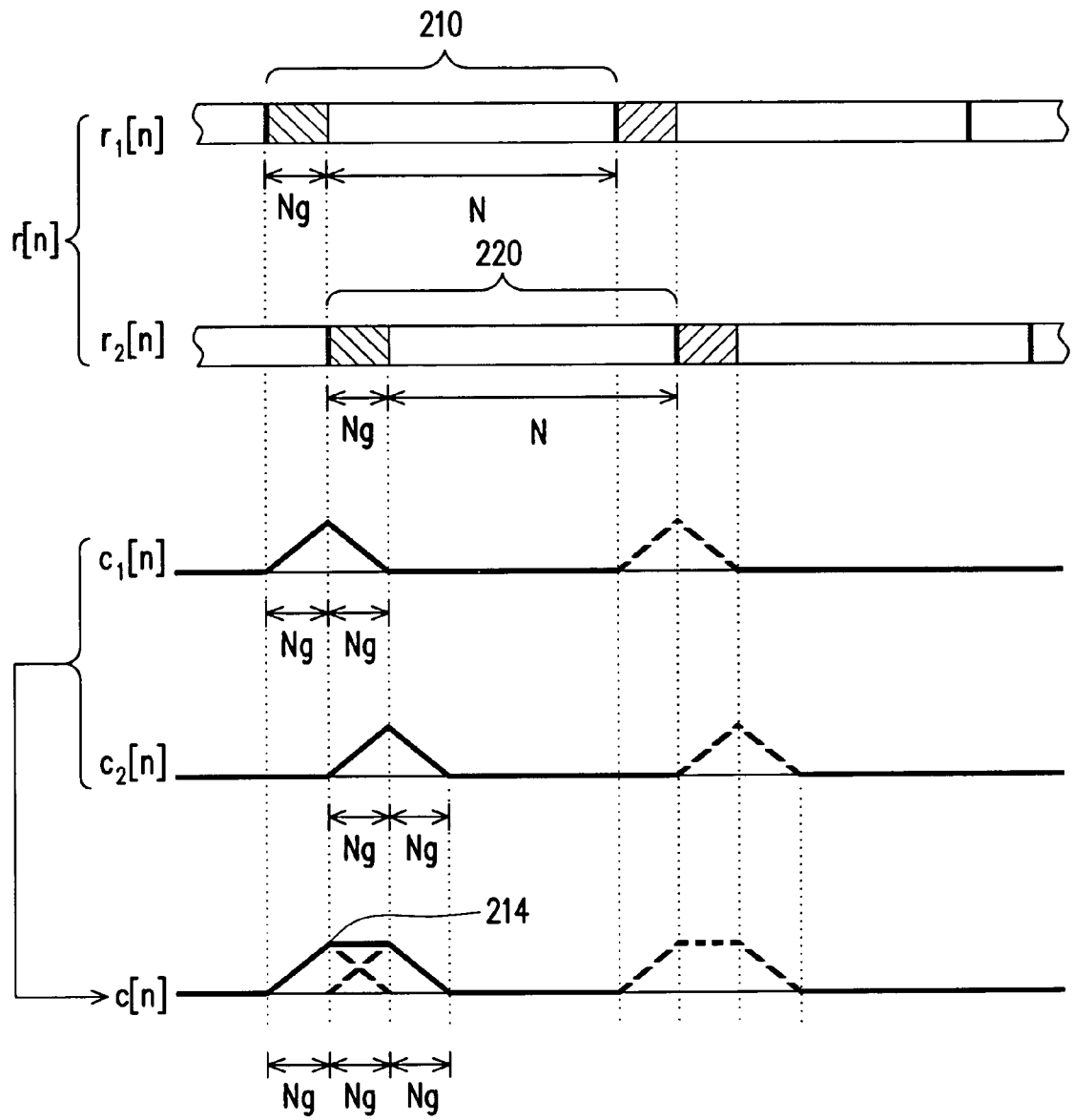
FIG. 2 is a schematic diagram of applying the method for symbol timing synchronization of FIG. 1 into the SFN channel with two paths, wherein these two paths have the same gain, and the path difference between them is Ng.
Figure 3A:
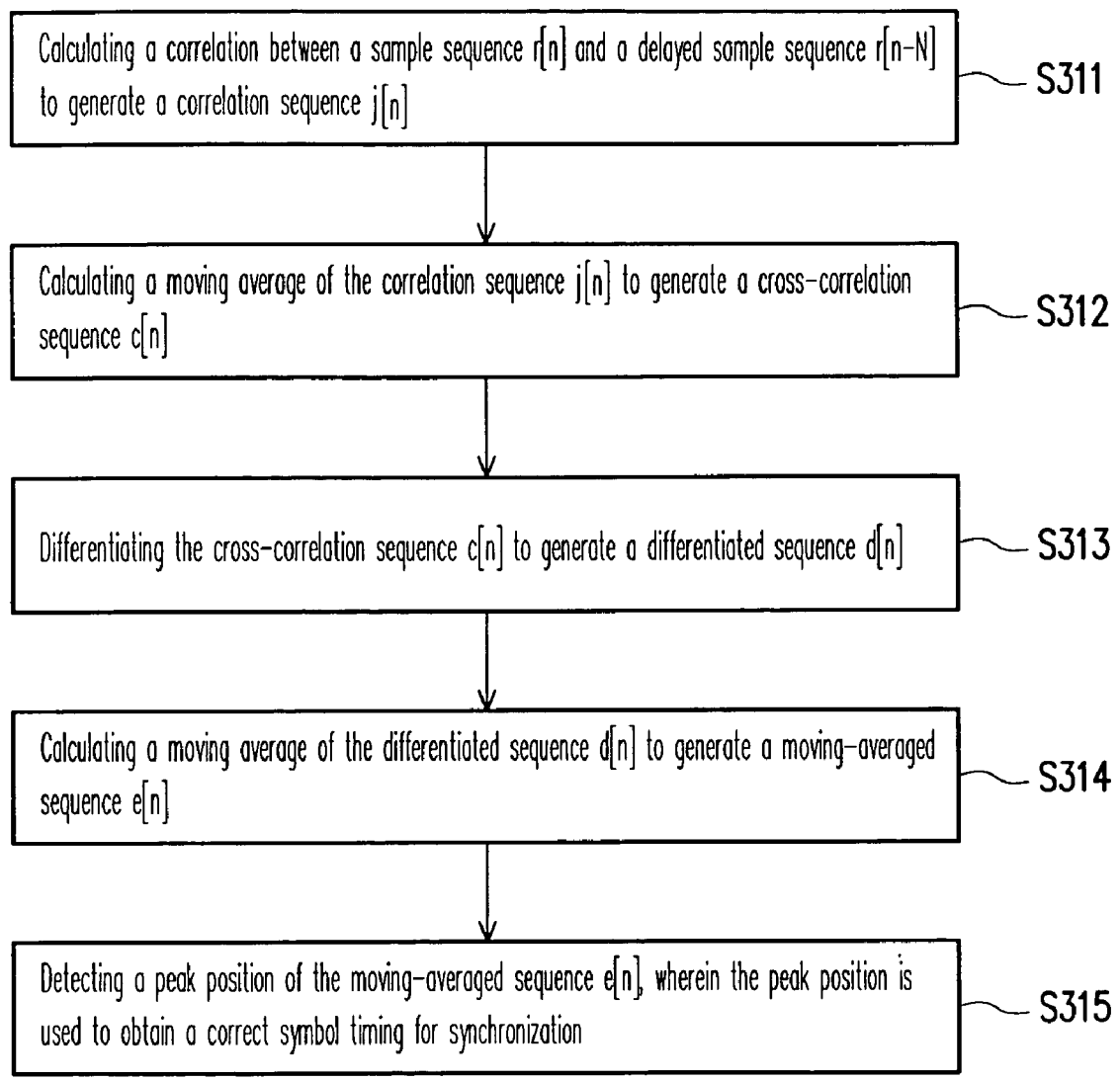
FIGS. 3A and 3B schematically show a flow chart illustrating a method for symbol timing synchronization according to an embodiment of the present invention.
Figure 4A:
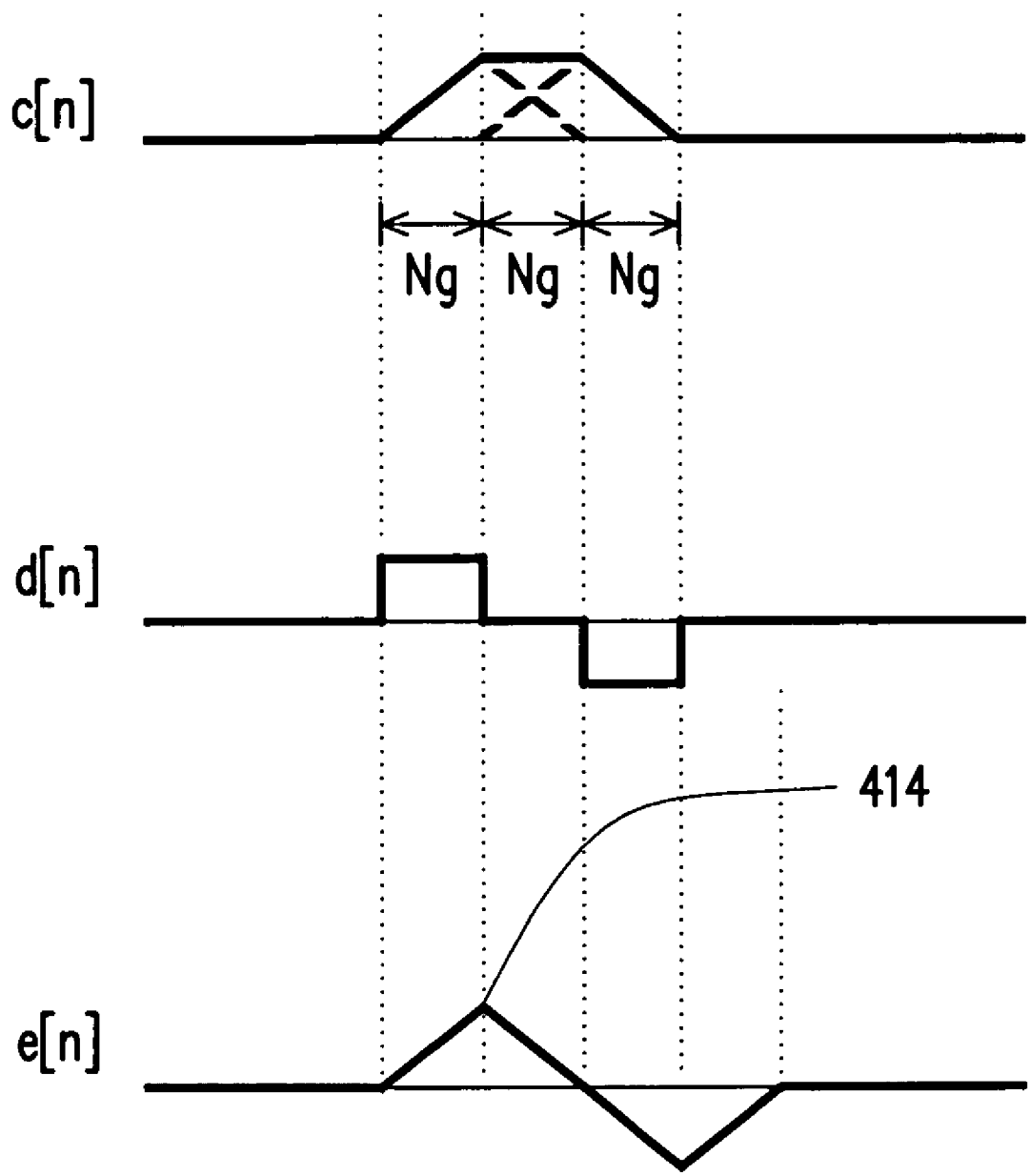
FIGS. 4A and 4B schematically show the signals and the signal simulation in a method for symbol timing synchronization according to an embodiment of the present invention.

FIG. 3A schematically shows a flow chart illustrating a method for symbol timing synchronization according to an embodiment of the present invention, and FIG. 4A schematically shows the signals used in a method for symbol timing synchronization described in FIG. 3A. Referring to FIGS. 3A and 4A, first in step S311, a correlation between a sample sequence r[n] and a delayed sample sequence r[n−N] obtained from delaying the sample sequence r[n] by N sampling points is calculated to generate a correlation sequence j[n], where N is the length of the useful data for a symbol in the sample sequence r[n]. Here, the correlation sequence j [n] is, for example, (r*[n]×r[n−N]) or (r[n]×r*[n−N]). Alternatively, the multiplication in the above equation may be substituted by the subtraction or the power subtraction. Then, in step S312, a moving average of the correlation sequence j[n] is calculated to obtain a cross-correlation sequence c[n]. It is obvious that the flow of steps S311 to S312 is the same as the flow shown in FIG. 1 or FIG. 2. Thus, the details of generating the cross-correlation sequence c[n] shown in FIG. 4A from steps S311 to S312 is intentionally omitted herein.

Then, in step S313, the cross-correlation sequence c[n] is differentiated to generate a differentiated sequence d[n]. Wherein, the differentiation is implemented by various methods, such as d[n]=c[n]−c[n−1] or d[n]=c[n]−c[n+1], where the differentiation is implemented by the subtraction operation. Then, in step S314, a moving average of the differentiated sequence d[n] is calculated to generate a moving-averaged sequence e[n]. Finally, in step S315, the position of the peak 414 in the moving-averaged sequence e[n] is detected and the position of peak 414 is used for calculating the correct symbol timing for synchronization.

Figure 3B:
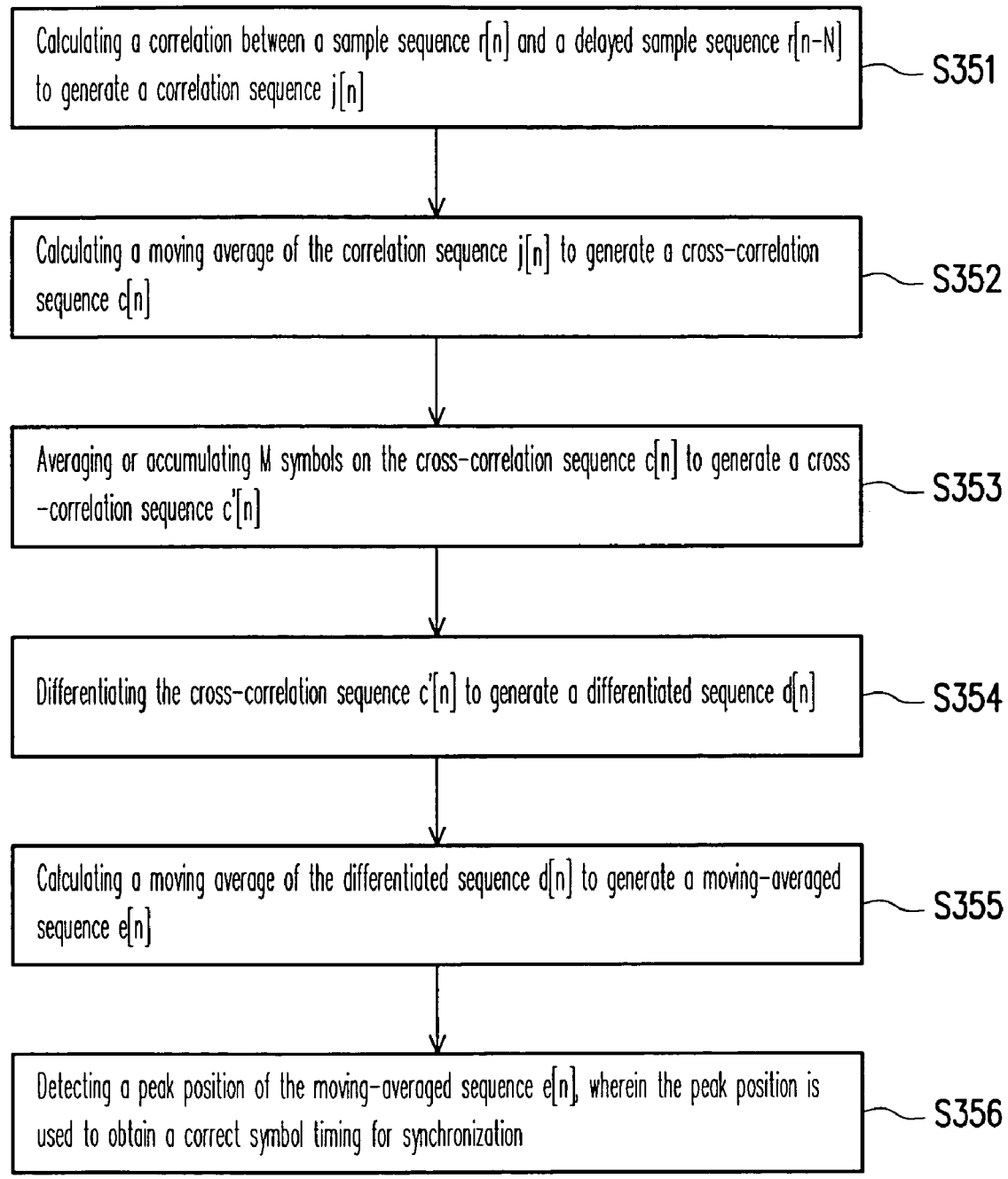
Figure 4B:
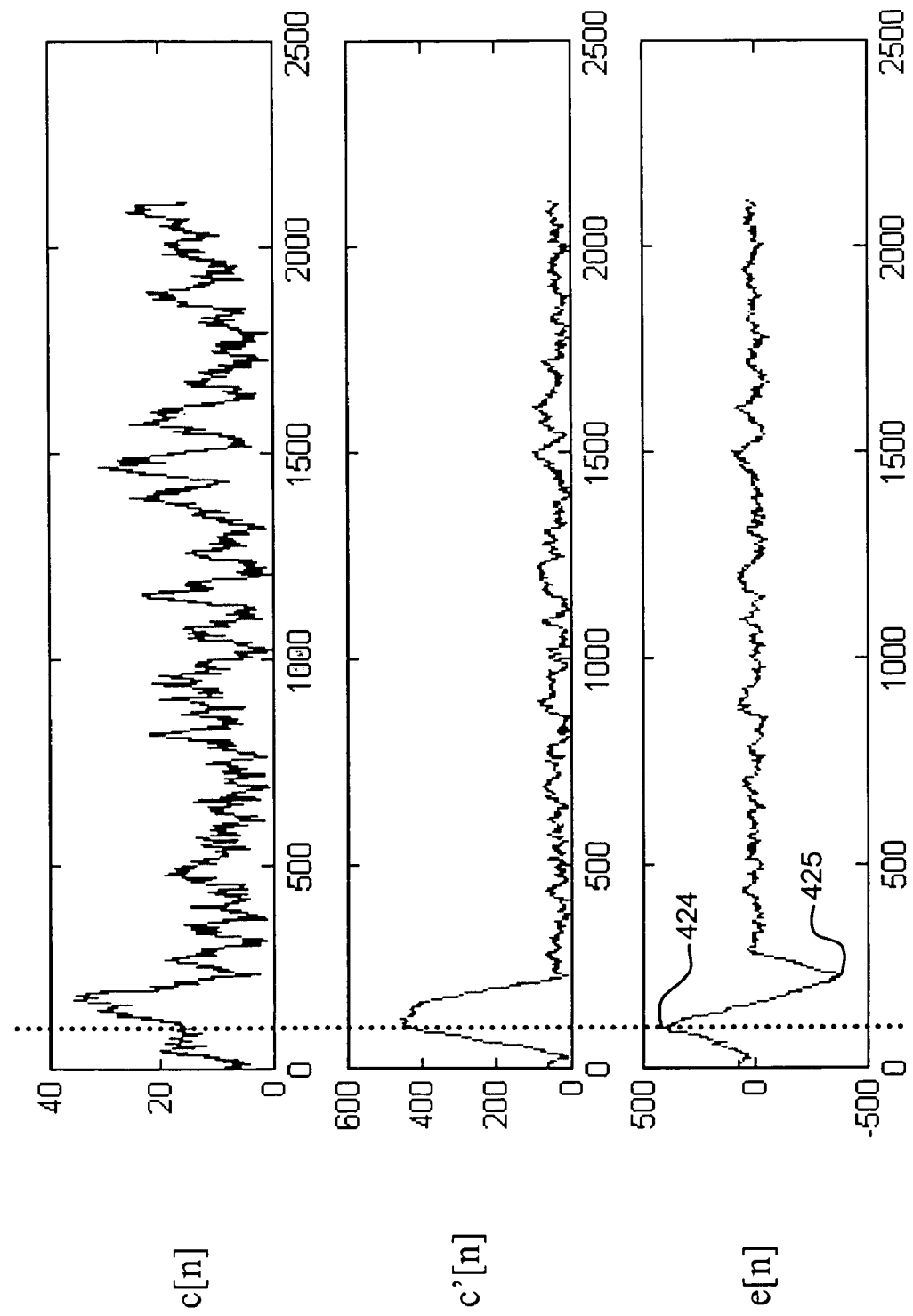

FIG. 3B schematically shows a flow chart illustrating a method for symbol timing synchronization according to another embodiment of the present invention, and FIG. 4B is the related signal simulation diagram when a method for symbol timing synchronization described in FIG. 3B is applied to the SFN channel with two paths. Referring to FIGS. 3B and 4B, the steps S351, S352, S354, S355 and S356 of FIG. 3B are actually the same as the steps S311, S312, S313, S314, and S315 of FIG. 3A, respectively. The difference between the method shown in FIG. 3B and the method shown in FIG. 3A is that after the moving average of the correlation sequence j [n] is calculated to generate the cross-correlation sequence c[n] (i.e. step S312 or S352), and before differentiating the cross-correlation sequence c[n] to generate the differentiated sequence d[n] (i.e. step S313 or S354), a process of averaging or accumulating M symbols on the cross-correlation sequence c[n] (i.e. step S353) is performed, where M is a positive integer.

As shown in FIG. 4B, the noise level of the cross-correlation sequence c'[n] is decreased, and a distinct peak region is generated, wherein the cross-correlation sequence c'[n] is generated by symbol-averaging the cross-correlation sequence c[n]. Meanwhile, the sequence e[n] through the differentiation and the moving average has a distinct peak 424 rather than a flat region. In addition, the difference between the peak value 424 (i.e. the maximum value) and the minimum value 425 of the sequence e[n] is defined as an indicator. It is very possible that the received signal contains the OFDM signal symbol if the value of the indicator is greater than a predetermined threshold. Accordingly, the indicator can be used to speed up the channel scan procedure.

Figure 5A:
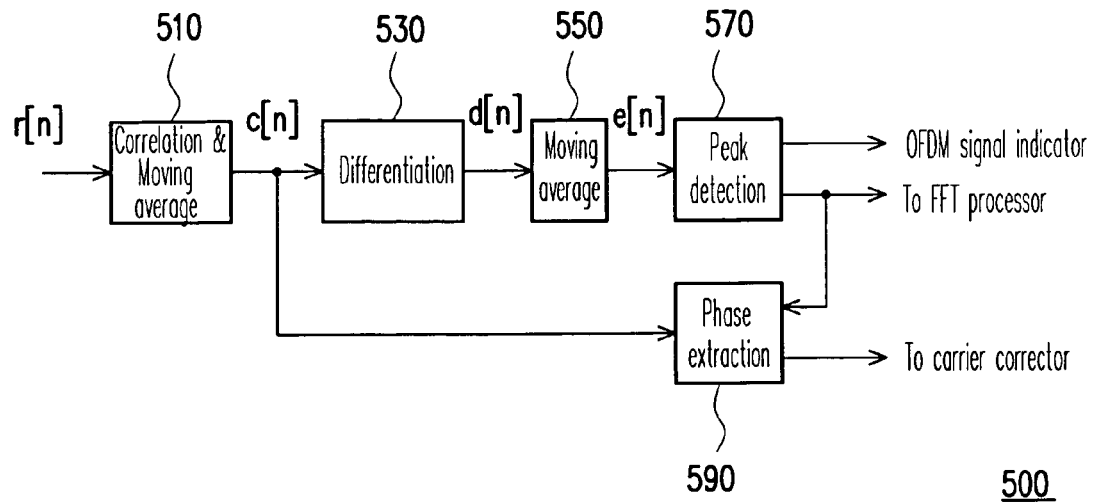
FIGS. 5A and 5B schematically show the block diagrams of a symbol timing synchronization apparatus according to an embodiment of the present invention, which corresponds to the method for symbol timing synchronization described in FIGS. 3A and 3B, respectively.
Figure 5B:
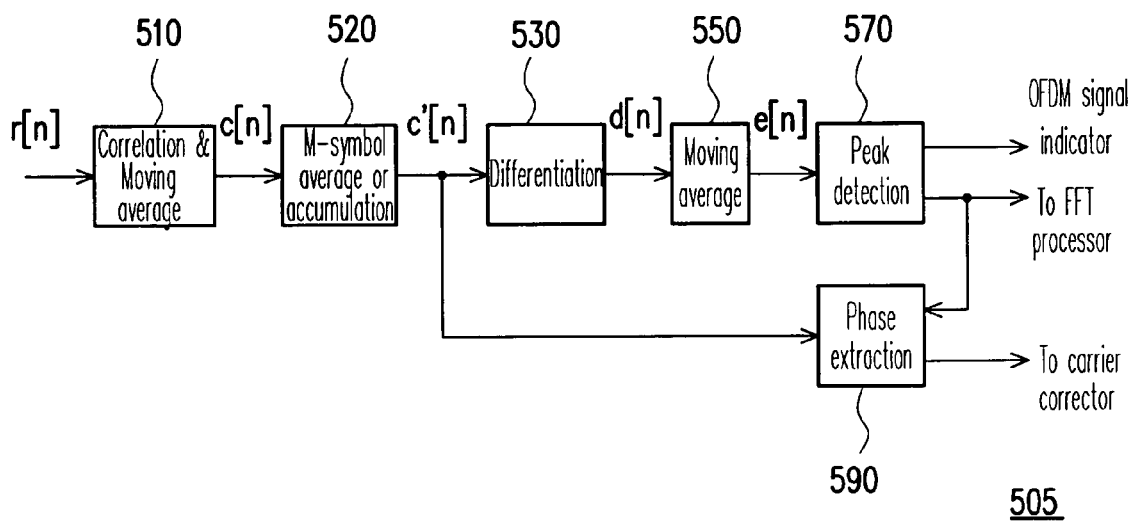

FIGS. 5A and 5B schematically show the block diagrams of a symbol timing synchronization apparatus according to an embodiment of the present invention, which corresponds to the method for symbol timing synchronization described in FIGS. 3A and 3B, respectively. Referring to FIG. 5A, the symbol timing synchronization apparatus 500 comprises a correlation calculator 510, a differentiator 530, a moving average calculator 550, a peak detector 570 and a phase extractor 590. Wherein, the correlation calculator 510 receives a sample sequence r[n], calculates a correlation between the sample sequence r[n] and a delayed sample sequence r[n−N] obtained from delaying the sample sequence r[n] by N sampling points to generate a correlation sequence, and obtains a moving average of the correlation sequence to generate a cross-correlation sequence c[n], where N is the length of the useful data for a symbol in the sample sequence r[n]. The differentiator 530 is coupled to the correlation calculator 510 for differentiating the cross-correlation sequence c[n] to generate the differentiated sequence d[n]. The moving average calculator 550 is coupled to the differentiator 530 for averaging the differentiated sequence d[n] to generate the moving-averaged sequence e[n].

The peak detector 570 is coupled to the moving average calculator 550 for detecting the peak position of the moving-averaged sequence e[n]. The peak position is the symbol starting position which is provided for the N-point DFT (Discrete Fourier Transform) processor or the FFT (Fast Fourier Transform) processor in the OFDM system. In addition, the peak detector 570 further provides an indicator, wherein the indicator is a difference between the peak value (i.e. the maximum value) and the minimum value of the sequence e[n]. It is very possible that the received signal contains the OFDM symbol when the value of the indicator is greater than a predetermined threshold. Accordingly, the indicator can be used for speeding up the channel scan procedure. Moreover, the phase extractor 590 is coupled to the outputs of the correlation calculator 510 and the peak detector 570 for extracting the phase of the peak of the cross-correlation sequence c[n]. Wherein, the extracted phase is used for calibrating the fractional carrier frequency offset between the transmitter and the receiver.

Referring to FIG. 5B, the symbol timing synchronization apparatus 505 is similar to the symbol timing synchronization apparatus 500, and the difference is that the symbol timing synchronization apparatus 505 further comprises an apparatus 520, wherein the apparatus 520 may be a symbol average calculator or a symbol accumulator. The symbol average calculator (or the symbol accumulator) 520 is coupled between the correlation calculator 510 and the differentiator 530 for averaging (or accumulating) M symbols on the cross-correlation sequence c[n] to generate the symbol-average (or accumulated) cross-correlation sequence c'[n], where M is a positive integer. Meanwhile, the phase extractor 590 is coupled to the output of the symbol average calculator (or the symbol accumulator) 520, the input of the differentiator 530, and the output of the peak detector 570.

Figure 6A:
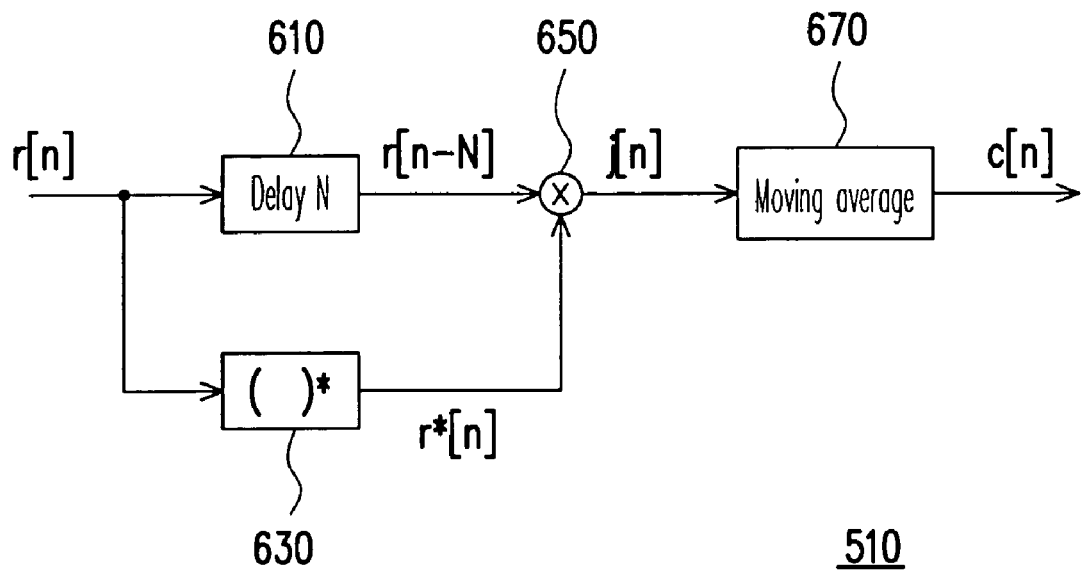
FIGS. 6A and 6B schematically show the block diagrams of the correlation calculators in a symbol timing synchronization apparatus according to an embodiment of the present invention, respectively.

FIGS. 6A. and 6B schematically show the block diagrams of the correlation calculators in a symbol timing synchronization apparatus according to an embodiment of the present invention, respectively. Referring to FIG. 6A, the correlation calculator 510 comprises a delay unit 610, a complex conjugate calculator 630, a multiplier 650 and a moving average calculating unit 670. The delay unit 610 receives a sample sequence r[n] and delays the received sample sequence r[n] by N sampling points to generate a sequence r[n−N]. The complex conjugate calculator 630 receives the sample sequence r[n], and obtains a complex conjugate of the received sample sequence r[n] to generate a sequence r*[n]. The multiplier 650, coupled to the outputs of the delay unit 610 and the complex conjugate calculator 630, multiplies the received sequence r[n−N] by the received sequence r*[n] to generate a correlation sequence j[n]. The moving average calculating unit 670 coupled to the output of the multiplier 650 obtains a moving average of the correlation sequence j [n] to generate a cross-correlation sequence c[n].

Figure 6B:
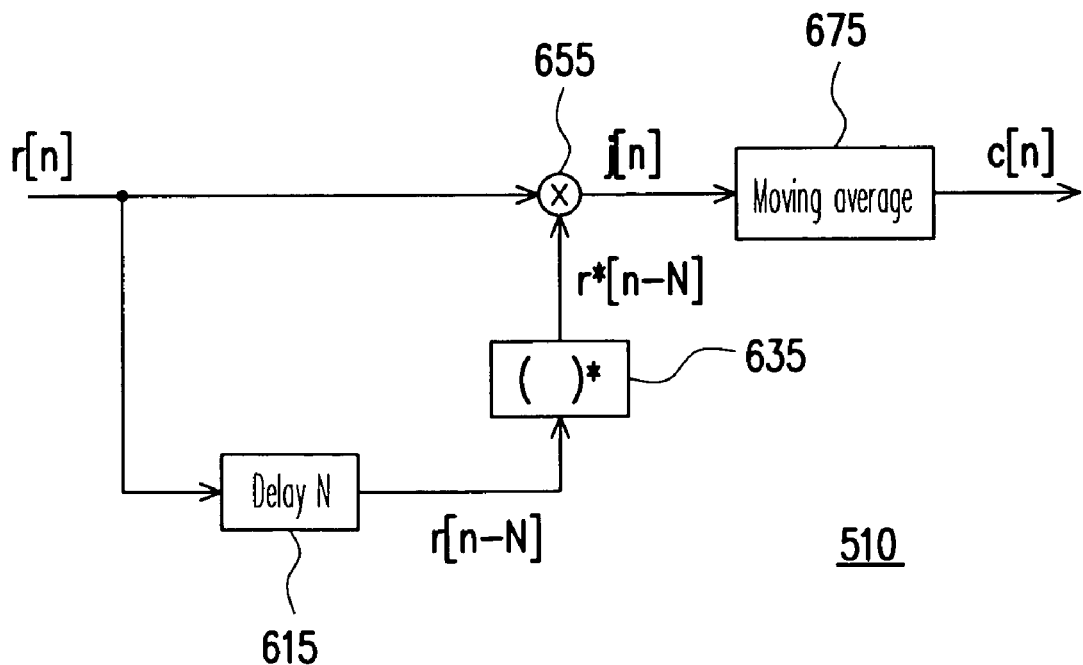

Another correlation calculator 510 is embodied as shown in FIG. 6B, the correlation calculator 510 comprises a delay unit 615, a complex conjugate calculator 635, a multiplier 655 and a moving average calculating unit 675. The delay unit 615 receives a sample sequence r[n] and delays the received sample sequence r[n] by N sampling points to generate a sequence r[n−N]. The complex conjugate calculator 635 coupled to the output of the delay unit 615 takes a complex conjugate of the sequence r[n−N] to generate a sequence r*[n−N]. The multiplier 655 coupled to the outputs of the complex conjugate calculator 635 multiplies the received sequence r[N] by the received sequence r*[n−N] to generate a correlation sequence j[n]. The moving average calculating unit 675 coupled to the output of the multiplier 655 calculates a moving average of the correlation sequence j [n] to generate a cross-correlation sequence c[n].

Figure 7:
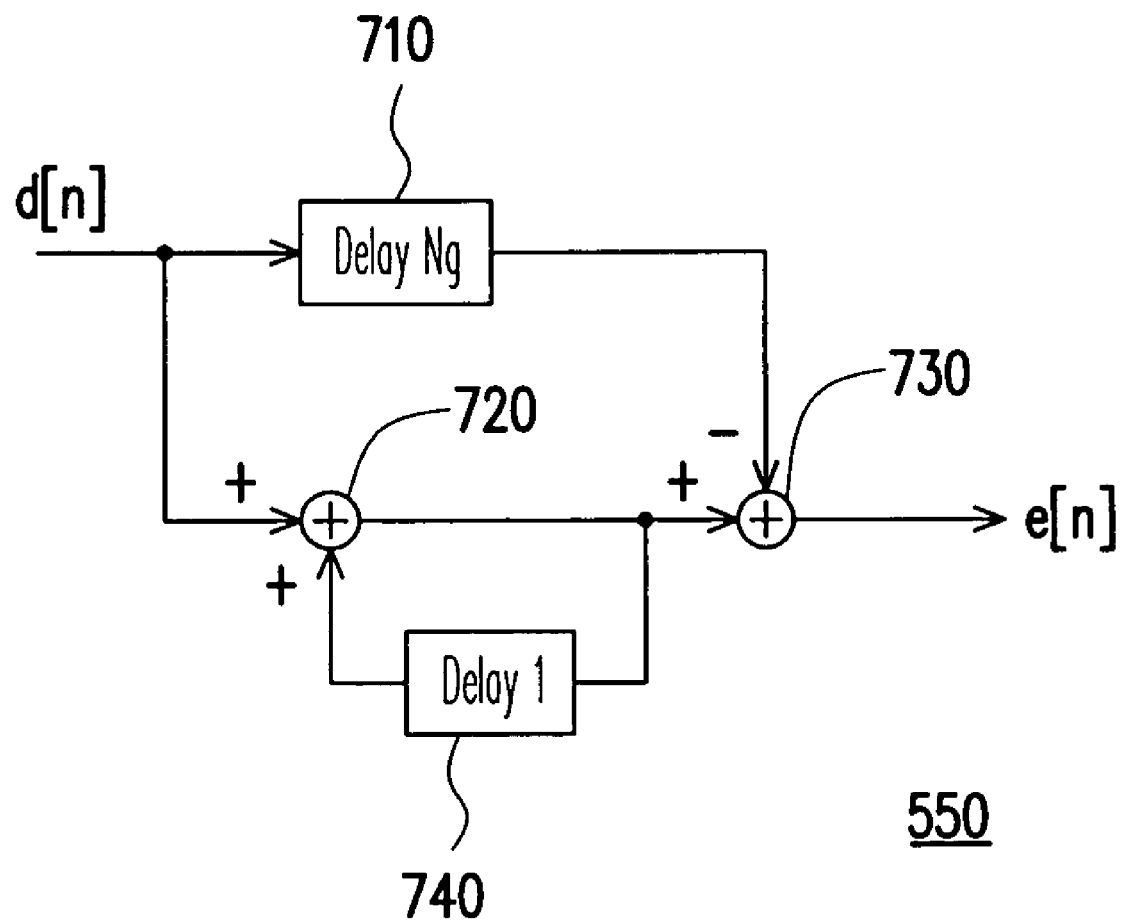
FIG. 7 schematically shows a block diagram of a moving average calculator in a symbol timing synchronization apparatus according to an embodiment of the present invention.

FIG. 7 schematically show a block diagram of a moving average calculator in a symbol timing synchronization apparatus according to an embodiment of the present invention. Referring to FIG. 7, the moving average calculator 550 comprises a first delay unit 710, a second delay unit 740, an adder 720 and a subtractor 730. Wherein, an input terminal of the first delay unit 710 receives a differentiated sequence d[n], and a delayed sequence obtained from delaying the received differentiated sequence d[n] by Ng sampling points is output from an output terminal of the first delay unit 710, wherein Ng is the length of the guard interval for a symbol in the sample sequence r[n]. The adder 720 summates a signal received from a first input terminal of the adder 720 and a signal received from a second input terminal of the adder 720, and outputs a summation result from its output terminal. Wherein, the first input terminal of the adder 720 receives the differentiated sequence d[n], and the second input terminal of the adder 720 is coupled to an output terminal of the second delay unit 740. The second delay unit 740 delays a signal received from an input terminal by one sampling point and a delayed signal is output from its output terminal. Wherein, the input terminal of the second delay unit 740 is coupled to the output terminal of the adder 720, and the output terminal of the second delay unit 740 is coupled to the second input terminal of the adder 720. The subtractor 730 subtracts a signal received from a first input terminal of the subtractor 730 by a signal received from a second input terminal of the subtractor 730 to generate a moving-averaged sequence e[n], and the moving-averaged sequence e[n] is output from its output terminal. Wherein, the first input terminal of the subtractor 730 is coupled to the output terminal of the adder 720, and the second input terminal of the subtractor 730 is coupled to the output terminal of the first delay unit 710.

Figure 8A:
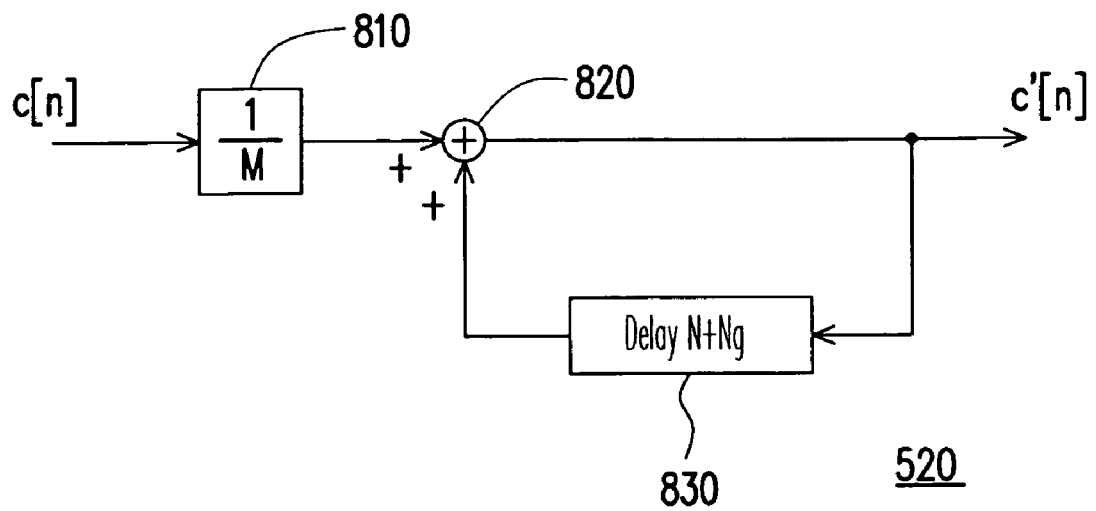
FIGS. 8A and 8B schematically show the block diagrams of a symbol average calculator and a symbol accumulator in a symbol timing synchronization apparatus according to an embodiment of the present invention, respectively.
Figure 8B:
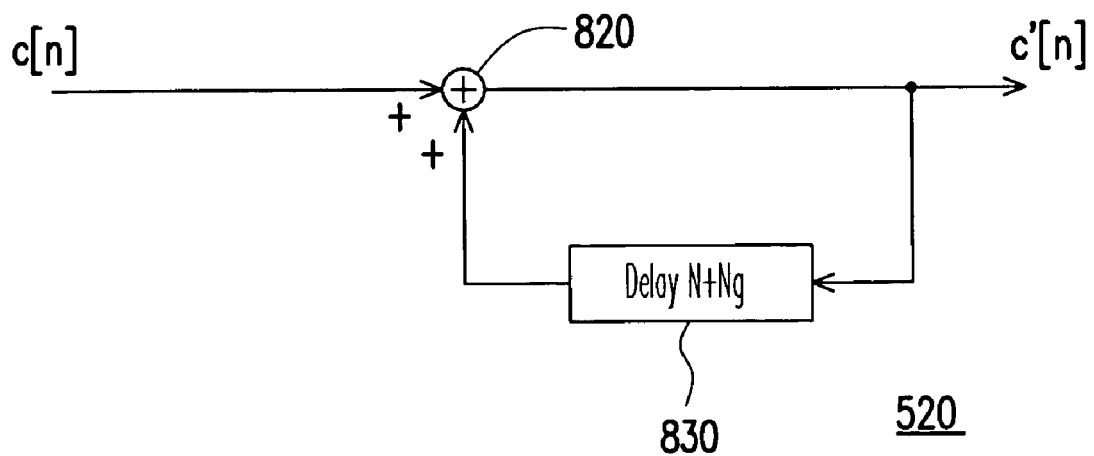

FIGS. 8A and 8B schematically show the block diagrams of a symbol average calculator and a symbol accumulator in a symbol timing synchronization apparatus according to an embodiment of the present invention, respectively. Referring to FIG. 8A, the symbol average calculator 520 comprises a divider 810, an adder 820 and a delay unit 830. Wherein, an input terminal of the divider 810 receives a cross-correlation sequence c[n], divides the cross-correlation sequence c[n] by M, and outputs the division result from an output terminal of the divider 810, where M is a number used in calculating the average symbol. The adder 820 summates a signal received from a first input terminal of the adder 820 and a signal received from a second input terminal of the adder 820 to generate a symbol-averaged cross-correlation sequence c'[n], which is then output from an output terminal of the adder 820. Wherein, the first input terminal of the adder 820 is coupled to the output terminal of the divider 810, and the second input terminal of the adder 820 is coupled to the output terminal of the delay unit 830. The delay unit 830 delays a signal received from an input terminal of the delay unit 830 by (N+Ng) sampling points, and the delayed signal is then output from its output terminal. Wherein, the input terminal of the delay unit 830 is coupled to the output terminal of the adder 820, and the output terminal of the delay unit 830 is coupled to the second input terminal of the adder 820.

In addition to the symbol average calculator 520 shown in FIG. 8A, the apparatus 520 shown in FIG. 5B can also be the symbol accumulator 520 shown in FIG. 8B. Referring to FIG. 8B, the symbol accumulator 520 is equal to the symbol average calculator 520 shown in FIG. 8A without the divider 810. In other words, the cross-correlation sequence c[n] is directly received by the first input terminal of the adder 820.

In summary, in the method for symbol timing synchronization and the apparatus applying the same provided by the present invention, the cross-correlation sequence c[n] is first differentiated and a moving average is then calculated. Thus, even when the OFDM signal is in a time-dispersive channel with long echo delay, a distinct peak is able to be generated. Accordingly, the symbol timing detection provided by the present invention has a higher reliability. Of course, the method and apparatus of the present invention are suitable for other type of channels, such as the AWGN, Rayleigh, or SFN channels.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A method for symbol timing synchronization suitable for a receiver in a communication system, the method comprising:
    calculating a correlation between a sample sequence and a delayed sample sequence to generate a correlation sequence;
    calculating a moving average of the correlation sequence to generate a cross-correlation sequence;
    differentiating the cross-correlation sequence to generate a differentiated sequence by subtracting a delayed cross-correlation sequence from the cross-correlation sequence;
    calculating a moving average of the differentiated sequence to generate a moving-averaged sequence; and
    detecting a peak position of the moving-averaged sequence to obtain a correct symbol timing for synchronization;
    wherein the delayed sample sequence is obtained from delaying the sample sequence by N sampling points, and N is the length of the useful data for a symbol in the sample sequence.

2. The method for symbol timing synchronization of claim 1, further comprising averaging or accumulating M symbols on the cross-correlation sequence before differentiating the cross-correlation sequence to generate the differentiated sequence, where M is a positive integer.

3. The method for symbol timing synchronization of claim 1, further comprising providing an indicator, wherein the indicator is compared with a predetermined threshold to determine whether symbols exist or not, and the indicator is a difference between a peak value and a minimum value of the moving-averaged sequence.

4. The method for symbol timing synchronization of claim 1, wherein the correlation sequence is obtained from multiplying a complex conjugate of the sample sequence by the delayed sample sequence.

5. The method for symbol timing synchronization of claim 1, wherein the correlation sequence is obtained from multiplying the sample sequence by a complex conjugate of the delayed sample sequence.

6. The method for symbol timing synchronization of claim 1, wherein the correlation sequence is obtained from subtracting or power subtracting the sample sequence by the delayed sample sequence.

7. The method for symbol timing synchronization of claim 1, wherein the delayed cross-correlation sequence is delayed by one sampling point with respect to the cross-correlation sequence.

8. A symbol timing synchronization apparatus suitable for a receiver in a communication system, the apparatus comprising:
a correlation calculator for receiving a sample sequence, calculating a correlation between the sample sequence and a delayed sample sequence to generate a correlation sequence, and calculating a moving average of the correlation sequence to generate a cross-correlation sequence;
a differentiator coupled to the correlation calculator for differentiating the cross-correlation sequence to generate a differentiated sequence by subtracting a delayed cross-correlation sequence from the cross-correlation sequence, wherein the delayed cross-correlation sequence is delayed by one sampling point with respect to the cross-correlation sequence;
a moving average calculator coupled to the differentiator for calculating a moving average of the differentiated sequence to generate a moving-averaged sequence; and
a peak detector coupled to the moving average calculator for detecting a peak position of the moving-averaged sequence to obtain a correct symbol timing for synchronization;
wherein, the delayed sample sequence is obtained from delaying the sample sequence by N sampling points, and N is the length of the useful data for a symbol in the sample sequence.

9. The symbol timing synchronization apparatus of claim 8, further comprising a phase extractor coupled to outputs of the correlation calculator and the peak detector for extracting a phase of peak from the cross-correlation sequence.

10. The symbol timing synchronization apparatus of claim 8, further comprising a symbol average calculator coupled between the correlation calculator and the differentiator for averaging M symbols on the cross-correlation sequence to generate a symbol-averaged cross-correlation sequence, where M is a positive integer.

11. The symbol timing synchronization apparatus of claim 10, further comprising a phase extractor coupled between an input of the differentiator and an output of the peak detector for extracting a phase of peak from the symbol-averaged cross-correlation sequence.

12. The symbol timing synchronization apparatus of claim 8, further comprising a symbol accumulator coupled between the correlation calculator and the differentiator for accumulating M symbols on the cross-correlation sequence to generate a symbol-accumulated cross-correlation sequence, where M is a positive integer.

13. The symbol timing synchronization apparatus of claim 12, further comprising a phase extractor coupled between an input of the differentiator and an output of the peak detector for extracting a phase of peak from the symbol-accumulated cross-correlation sequence.

14. The symbol timing synchronization apparatus of claim 12, wherein the symbol accumulator comprises:
an adder having a first input terminal receiving the cross-correlation sequence, a second input terminal and an output terminal, wherein the adder summates a signal received from the first input terminal of the adder and a signal received from the second input terminal of the adder to generate a symbol-accumulated cross-correlation sequence, and the symbol-accumulated crass-correlation sequence is output from the output terminal of the adder; and
a delay unit having an input terminal coupled to the output terminal of the adder and an output terminal coupled to the second input terminal of the adder, wherein the delay unit delays a signal received from the input terminal of the delay unit by (N+Ng) sampling points, and outputs the delayed signal from the output terminal of the delay unit, where (N+Ng) is the length of a symbol.

15. The symbol timing synchronization apparatus of claim 8, wherein the peak detector further provides an indicator, the indicator is compared with a predetermined threshold in order to determine whether symbols exist or not, and the indicator is a difference between a peak value and a minimum value of the moving-averaged sequence.

16. The symbol timing synchronization apparatus of claim 8, wherein the communication system comprises an orthogonal frequency division multiplexing (OFDM) system.

17. The symbol timing synchronization apparatus of claim 8, wherein the correlation calculator comprises:
a delay unit for receiving the sample sequence and delaying the sample sequence by N sampling points to generate the delayed sample sequence;
a complex conjugate calculator for receiving the sample sequence and calculating a complex conjugate of the sample sequence;
a multiplier coupled to the delay unit and the complex conjugate calculator for multiplying the delayed sample sequence by the complex conjugate of the sample sequence to generate the correlation sequence; and
a moving average calculating unit coupled to the multiplier for calculating a moving average of the correlation sequence to generate the cross-correlation sequence.

18. The symbol timing synchronization apparatus of claim 8, wherein the correlation calculator comprises:
a delay unit for receiving the sample sequence and delaying the sample sequence by N sampling points to generate the delayed sample sequence;
a complex conjugate calculator coupled to the delay unit for calculating a complex conjugate of the delayed sample sequence;
a multiplier coupled to the complex conjugate calculator for receiving the sample sequence, multiplying the complex conjugate of the delayed sample sequence by the sample sequence to generate the correlation sequence; and a moving average calculating unit coupled to the multiplier for calculating a moving average of the correlation sequence to generate the cross-correlation sequence.

19. The symbol timing synchronization apparatus of claim 8, wherein the moving average calculator comprises:

a first delay unit having an input terminal for receiving the differentiated sequence and an output terminal, wherein the first delay unit delays the differentiated sequence by Ng sampling points and outputs the delayed differentiated sequence from the output terminal of the first delay unit, and Ng is the length of a guard interval for a symbol in the sample sequence;

an adder having a first input terminal for receiving the differentiated sequence, a second input terminal and an output terminal, wherein the adder summates a signal received from the first input terminal of the adder and a signal received from the second input terminal of the adder, and outputs a summation result from the output terminal of the adder;

a second delay unit having an input terminal coupled to the output terminal of the adder and an output terminal coupled to the second input terminal of the adder, wherein the second delay unit delays a signal received from the input terminal of the second delay unit by a sampling point, and outputs a delayed signal from the output terminal of the second delay unit; and a subtractor having a first input terminal coupled to the output terminal of the adder, a second input terminal coupled to the output terminal of the first delay unit, and an output terminal, wherein the subtractor subtracts a signal received from the first input terminal of the subtractor by a signal received from the second input terminal of the subtractor to generate the moving-averaged sequence, and outputs the moving-averaged sequence from the output terminal of the subtractor.

20. The symbol timing synchronization apparatus of claim 10, wherein the symbol average calculator comprises:

a divider having an input terminal receiving the cross-correlation sequence and an output terminal, wherein the divider divides the cross-correlation sequence by M and outputs a division result from the output terminal of the divider;

an adder having a first input terminal coupled to the output terminal of the divider, a second input terminal and an output terminal, wherein the adder summates a signal received from the first input terminal of the adder and a signal received from the second input terminal of the adder to generate a symbol-averaged cross-correlation sequence, and the symbol-averaged cross-correlation sequence is output from the output terminal of the adder; and a delay unit having an input terminal coupled to the output terminal of the adder and an output terminal coupled to the second input terminal of the adder, wherein the delay unit delays a signal received from the input terminal of the delay unit by (N+Ng) sampling points, and outputs the delayed signal from the output terminal of the delay unit, where (N+Ng) is the length of a symbol.

* * * * *